US008219772B2

(12) United States Patent
Smith et al.

(10) Patent No.: US 8,219,772 B2
(45) Date of Patent: Jul. 10, 2012

(54) LOADING SECURE CODE INTO A MEMORY

(75) Inventors: David Smith, Bristol (GB); Andrew Marsh, Bristol (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 430 days.

(21) Appl. No.: 12/497,227

(22) Filed: Jul. 2, 2009

(65) Prior Publication Data

US 2011/0004721 A1 Jan. 6, 2011

(51) Int. Cl.
*G06F 12/14* (2006.01)
*G06F 12/16* (2006.01)

(52) U.S. Cl. ........................................ 711/163; 711/154
(58) Field of Classification Search .................. 711/103, 711/154, 163, 170
See application file for complete search history.

(56) References Cited

U.S. PATENT DOCUMENTS

| 6,775,778 | B1 | 8/2004 | Laczko, Sr. et al. | |
| 8,001,390 | B2 * | 8/2011 | Hatakeyama | 713/190 |
| 8,006,095 | B2 * | 8/2011 | Berenbaum et al. | 713/180 |
| 2006/0015947 | A1 * | 1/2006 | Conti et al. | 726/34 |
| 2006/0112241 | A1 | 5/2006 | Weiss et al. | |
| 2006/0179324 | A1 * | 8/2006 | Hatakeyama | 713/187 |
| 2006/0294397 | A1 * | 12/2006 | Baker | 713/193 |
| 2007/0260838 | A1 * | 11/2007 | Schwemmlein | 711/163 |
| 2008/0022396 | A1 * | 1/2008 | Kado | 726/19 |
| 2008/0282093 | A1 * | 11/2008 | Hatakeyama | 713/190 |
| 2010/0005264 | A1 * | 1/2010 | Ito et al. | 711/163 |
| 2010/0082893 | A1 * | 4/2010 | Ma et al. | 711/103 |
| 2011/0066837 | A1 * | 3/2011 | Lee et al. | 713/2 |

FOREIGN PATENT DOCUMENTS

WO WO 02/03208 A2 1/2002

OTHER PUBLICATIONS

Extended Search Report dated Feb. 3, 2012 from corresponding European Application No. 10168091.6.

* cited by examiner

*Primary Examiner* — John Lane
(74) *Attorney, Agent, or Firm* — Wolf, Greenfield & Sacks, P.C.

(57) ABSTRACT

A method and system of controlling access to a programmable memory including: allowing code to be written to the programmable memory in a first access mode; preventing execution of the code stored in the programmable memory in the first access mode; verifying the integrity of the code stored in the programmable memory; if the integrity of the code stored in the programmable memory is verified, setting a second access mode, wherein in the second access mode, further code is prevented from being written to the programmable memory, and execution of the code stored in the programmable memory is allowed.

31 Claims, 9 Drawing Sheets

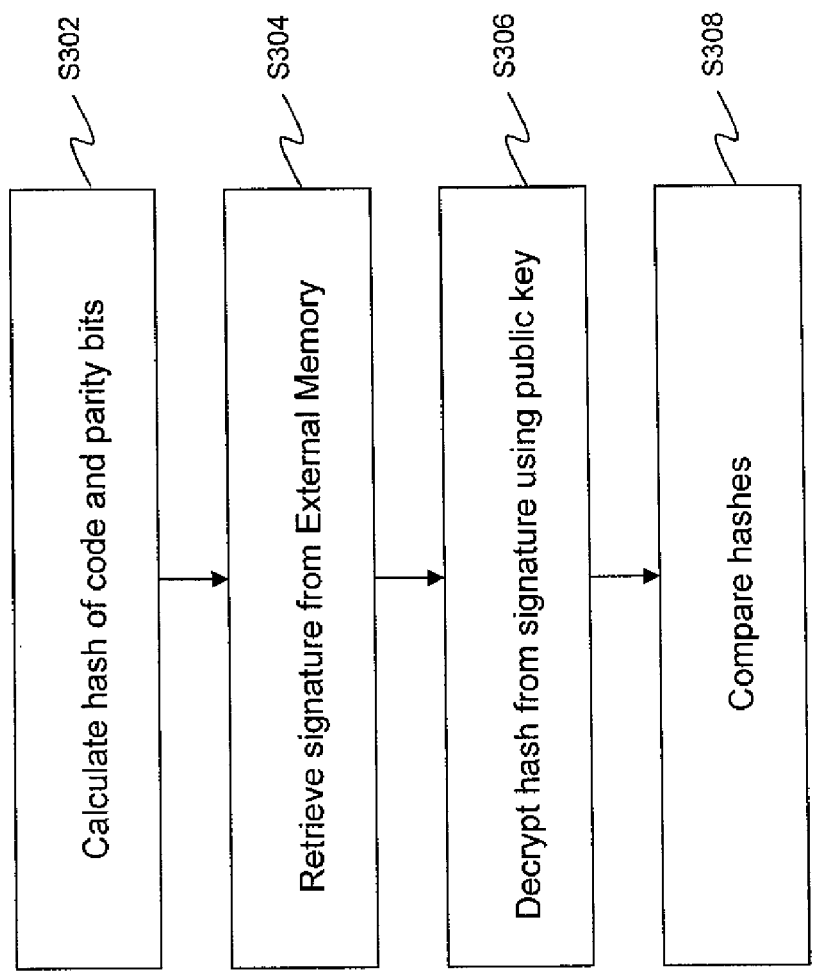

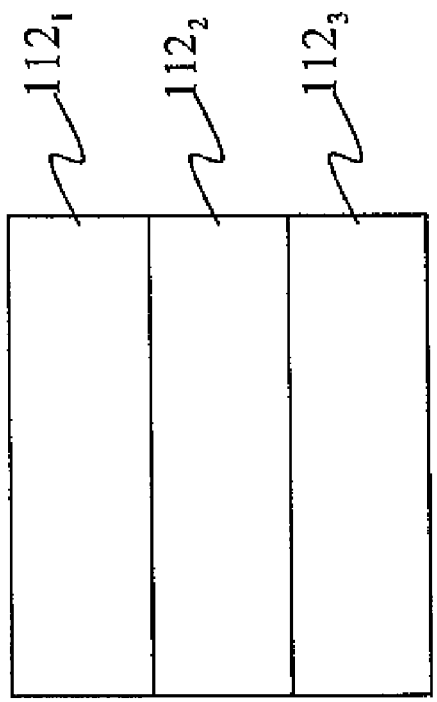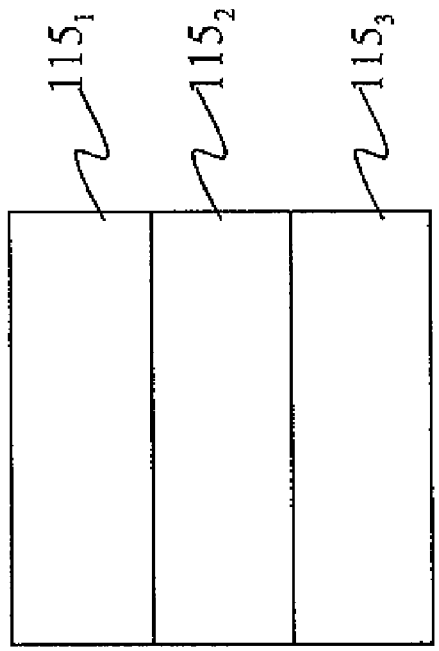
FIG 4b

LOADING SECURE CODE INTO A MEMORY

FIELD OF THE INVENTION

This invention relates to loading secure code into a memory from an untrusted source.

BACKGROUND OF THE INVENTION

In some computer systems it is often important to verify the authenticity of code before it is executed. In such computer systems code might only be executed if it is known to be from a trusted source. The computer system requires a mechanism of verifying that code is from a trusted source, rather than an untrusted source, before executing the code.

For example, digital TV set top boxes (STBs) are designed to decode content streams transmitted by broadcasters, and display them on a television screen. Many of these content streams are transmitted in an encrypted format, and they have to be decrypted before they can be displayed. Only true subscribers who have paid for the service are given permission to decrypt and view the content. Security features on the STB prevent non-subscribers from being able to decrypt and view the content streams. For this system to work effectively, it must be ensured that the STB is not bypassing the security features. Most STBs use programmable microprocessors, so in order to ensure that the security features are not bypassed, it is necessary to verify that code running on the microprocessors has come from a trusted source.

One method of ensuring the authenticity of code is to encode the code into a Read Only Memory (ROM) embedded in a chip of a computer system. This ensures the security of the code since it is very difficult to modify code stored in ROM. Therefore, chips can be supplied from a trusted supplier with code prestored in the ROM, such that the computer system can trust the code stored in the ROM.

However, storing code in ROM requires the code to be fixed at the time of manufacture, such that it cannot be changed at a future date. Storing code in this rigid manner in ROM is often undesirable, as developments or improvements to the code cannot be made after manufacture.

In order to allow developments or improvements to be made to code after manufacture, the code can be loaded from an external programmable memory. In this way, new developments or improvements to the code could be loaded into the external memory, and then loaded into the chip from the external memory. However, such a system would be less secure than that in which ROM on the chip is used because the code stored in the external memory might not come from a trusted source or the external memory could be replaced with a different, untrusted memory. In either of these ways, untrusted code could be loaded into the chip.

It is an aim of the present invention to provide a solution to the above mentioned problems of ensuring the security of code loaded into a chip.

SUMMARY OF THE INVENTION

In a first aspect of the invention there is provided a method of controlling access to a programmable memory in a computer system, the method comprising: allowing code to be written to the programmable memory in a first access mode; preventing execution of the code stored in the programmable memory in the first access mode; verifying the integrity of the code stored in the programmable memory; if the integrity of the code stored in the programmable memory is verified, setting a second access mode, wherein in the second access mode, further code is prevented from being written to the programmable memory, and execution of the code stored in the programmable memory is allowed.

In a second aspect of the invention there is provided a computer system comprising: programmable memory means for storing code; means for storing a value for setting a first access mode or a second access mode; logic means for allowing code to be written to the programmable memory means and preventing execution of the code stored in the programmable memory means in the first access mode; means for verifying the integrity of the code stored in the programmable memory means; and means for setting the second access mode if the integrity of the code stored in the programmable memory means is verified, wherein the logic means is configured to prevent further code from being written to the programmable memory means and to allow execution of the code stored in the programmable memory means in the second access mode.

In preferred embodiments, when a computer system is initialized, the system operates in a first access mode in which code can be written to a code RAM but code cannot be executed from the code RAM. In this way code is loaded into the code RAM but no execution of that code can occur during the first access mode. The code in the code RAM is then verified to ensure that it has come from a trusted source. Once the code has been loaded into the code RAM and verified then the system can switch to a second access mode. In the second access mode, code cannot be written to the code RAM. Therefore the code RAM acts as a read-only memory in the second access mode. This ensures that the authenticity of the code in the code RAM is maintained. Furthermore, in the second access mode, code can be executed from the code RAM.

The invention therefore provides a mechanism by which the code RAM can be used as a read only memory during the second access mode and so has the same advantages as using ROM in terms of ensuring the integrity of the code. However, unlike the system in which a ROM is used, the code written to the code RAM can be updated when developments or improvements to the code are released.

BRIEF DESCRIPTION OF THE DRAWINGS

For a better understanding of the present invention and to show how the same may be put into effect, reference will now be made, by way of example, to the following drawings in which:

FIG. 3 is a flow chart of a process for performing a signature check on code stored in a RAM according to a preferred embodiment;

FIG. 4b is a schematic diagram showing a plurality of register bits and a plurality of memory sections of a RAM;

DETAILED DESCRIPTION

Figure 1:
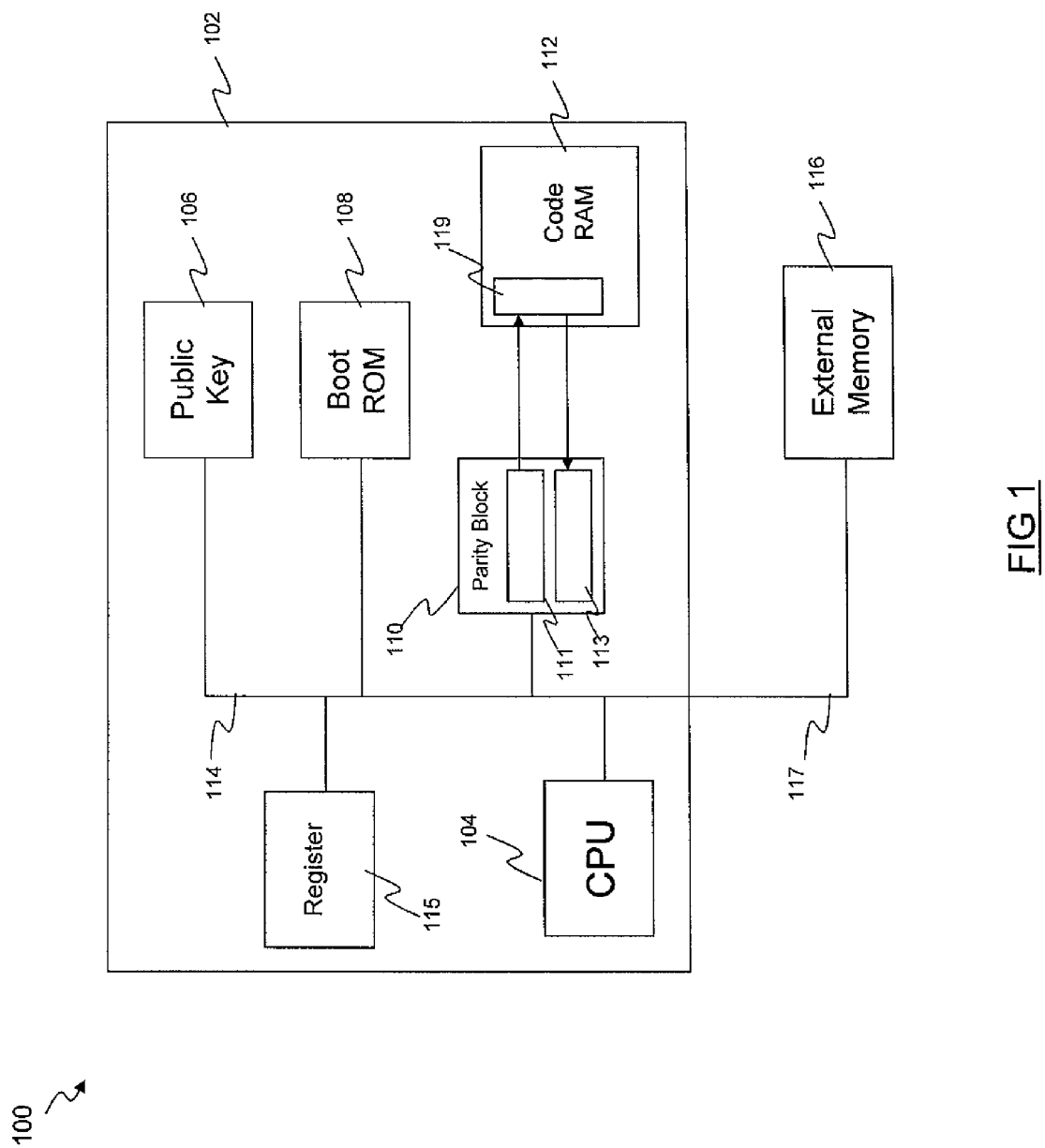
FIG. 1 is a schematic diagram representing a system according to a preferred embodiment of the present invention.

Reference is first made to FIG. 1, which illustrates a computer system 100 according to a preferred embodiment. The system 100 comprises a chip 102 and an external memory 116. The external memory 116 is external to the boundary of the chip 102 (off-chip memory), and is thus not secure. It is referred to herein as an insecure memory, meaning that it is accessible to third parties.

The chip 102 comprises a CPU 104, a public key 106, a boot ROM 108, a parity block 110, a code RAM 112, a register 115 and a bus 114. The parity block 110 comprises a parity generation block 111 and a parity checking block 113. The bus 114 couples the CPU 104, public key 106, boot ROM 108 and parity block 110 to each other. The code RAM 112 is coupled to the parity block 110. The insecure memory 116 is coupled to the bus 114 on the chip 102, via an external link 117. Logic 119 controls access to the code RAM 112.

Code can be stored in the insecure memory 116 which is to be loaded into the code RAM 112 and executed by the CPU 104 on the chip 102. In preferred embodiments the insecure memory 116 is capable of receiving updated code, which is supposed to come from a verified source. Because the code is loaded into the RAM 112 from the insecure memory 116, the code executed by the CPU 104 on the chip 102 can be updated when a new version of the code has been released by supplying the new code to the insecure memory 116, or by replacing the insecure memory with a new insecure memory. The new code can then be loaded into the code RAM 112 from the insecure memory 116 as described in more detail below. Although in the illustrated embodiment the insecure memory 116 is shown as external to the chip 102, in some embodiments, the insecure memory 116 may reside on the same chip as the other elements depicted in FIG. 1. It could still be insecure in the sense that it is accessible to unverified third parties. The code RAM 112 could be any type of programmable memory into which the code from the insecure memory 116 can be loaded. In this context programmable means it can be written or overwritten without a flash or burn process, i.e. away from the point of manufacture.

The CPU 104 is designed to boot directly from the Boot ROM 108. The code in the ROM 108 handles the booting and checking process described below. Two sets of code run on the CPU 104; (i) "Boot code" which is stored in the Boot ROM 108 on the chip 102 and which is programmed at design or manufacture; and (ii) "Application code" which is initially stored in the insecure memory 116, but which is then copied into the Code RAM 112 before being executed by the CPU 104.

Figure 2:
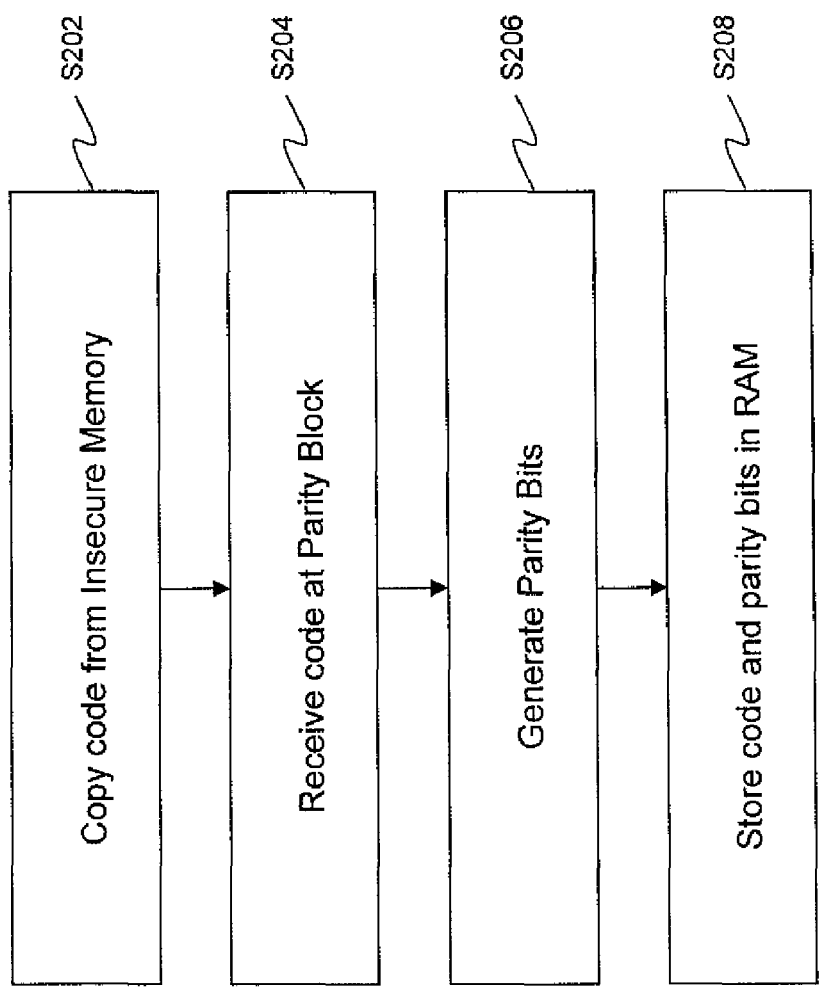
FIG. 2 is a flow chart of a process for loading code into a RAM according to a preferred embodiment.

With reference to FIGS. 1 and 2 there is now described a method for loading code into the code RAM 112 from the insecure memory 116 according to a preferred embodiment.

In step S202 the CPU 104 executes code stored in the boot ROM 108. The Boot code executed from the boot ROM 108 includes code instructing the CPU 104 to copy Application code from the insecure memory 116 to the code RAM 112. Therefore, Application code is retrieved from the insecure memory 116.

In step S204 the Application code is received via the link 117 at the parity block 110. In step S206 the parity generation block 111 of the parity block 110 generates extra bits for each word of the received Application code. The extra bits may be parity bits, or any other type of error detection bits which may be used to verify the integrity of the code. From hereon the extra bits will be referred to as parity bits, but it would be apparent to a skilled person that any other suitable error detection bits may be used instead of parity bits.

In step S208 the Application code and the generated parity bits are stored in the code RAM 112, each fetched word of Application code being stored with associated parity bits.

Figure 2A:
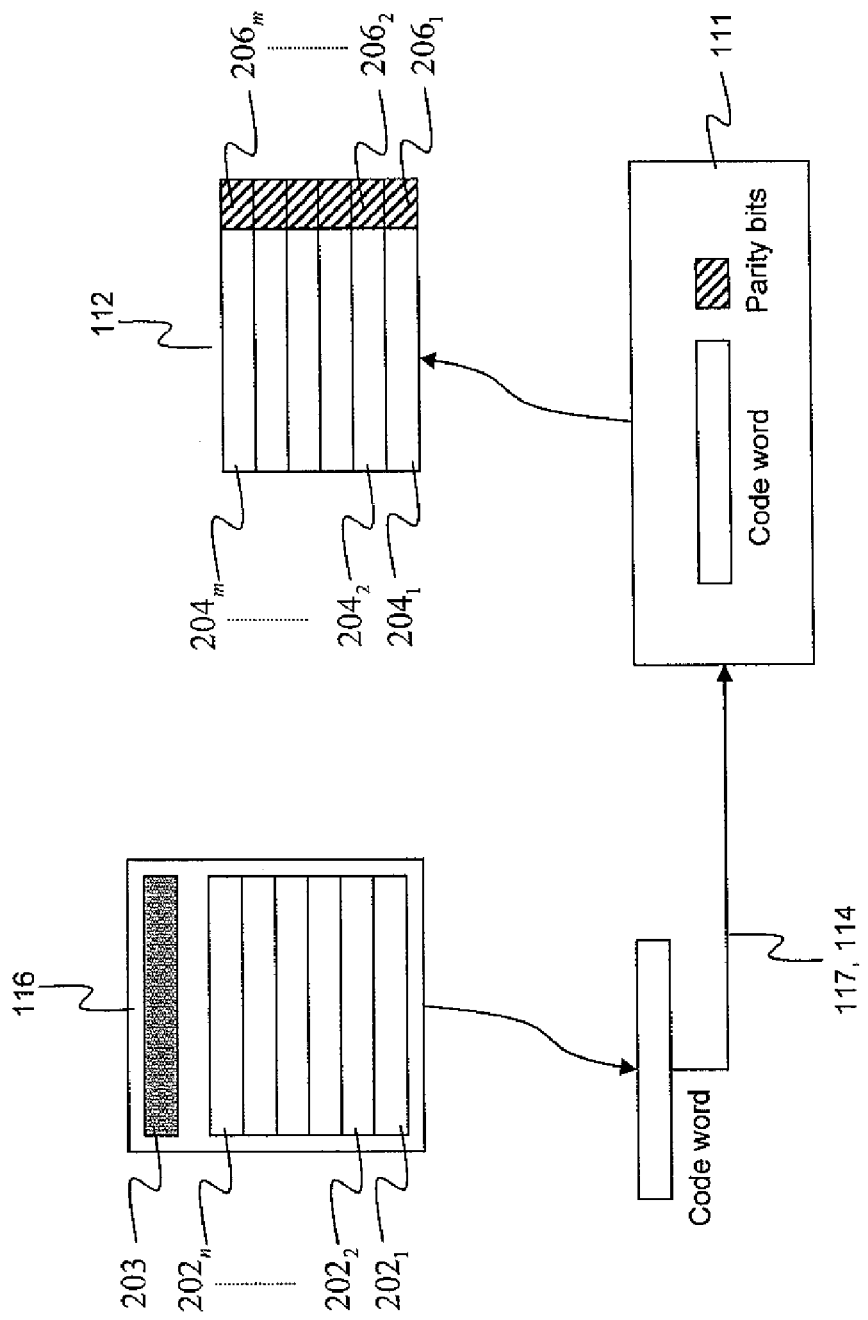
FIG. 2a is diagram representing a method of loading a code word from an insecure memory to a code RAM according to a preferred embodiment.

FIG. 2a shows the insecure memory 116 including a plurality of words $202_1$ to $202_n$ of code and a code signature 203. The code is stored in the insecure memory 116 and the code RAM in code words. The term "code word" is used in this specification to mean a number of bits of code which are accessed in one RAM access operation. Therefore in one fetch cycle, one code word can be accessed from the code RAM 112. The size of a code word is not necessarily dependent upon the size of individual instructions in the code. The size of a code word is dependent upon the characteristics of the code RAM 112, and in particular, the number of bits of code that can be accessed in each access cycle. When the code is loaded into the chip a code word of the code is fetched from the insecure memory 116 and passed to the parity generation block 111 in the parity block 110 via the link 117 and the bus 114. The parity generation block 111 generates error detection bits for each fetched code word from the insecure memory 116. The generated error detection bits are stored in the code RAM 112 with the instruction. In preferred embodiments, a fetched code word fetched in a fetch cycle may include any number of instructions of the code. The parity bits are calculated on a per code word basis, rather than on a per instruction basis. In this way the parity of each fetched code word can be stored in the code RAM 112 with the corresponding code word, irrespective of how the code words correspond to instructions of the code. FIG. 2a shows the code RAM 112 including a plurality of words $204_1$ to $204_m$ fetched from the insecure memory 116 stored with corresponding error detection bits $206_1$ to $206_m$ generated in the parity block 110.

In other, less preferred embodiments, the error detection bits could be generated on a per-instruction basis. However, in these embodiments, the parity checking logic would be required to understand the CPU instruction sizes.

With further reference to FIG. 2a, the code signature 203 has been calculated by calculating the parity bits for the application code in the insecure memory 116, then calculating a hash value of the application code plus parity bits, then encrypting the hash value using a private key. The hash value is preferably generated using the "Secure Hash Algorithm" (SHA), and then is preferably encrypted using a "Rivest, Shamir, and Adleman" (RSA) algorithm using the private key which corresponds to the public key 106.

With reference to FIG. 3 there is now described a method of performing an authentication check on code once it is stored in the code RAM 112 according to a preferred embodiment. In the preferred embodiment described below, the authentication check is a signature check. In other embodiments, other authentication checks may be used.

One way to improve the security of a computer system when loading code into a programmable memory on a chip from an external memory is to check the code loaded into the programmable memory. A signature check using an asymmetric key algorithm such as a public key-private key cryptography scheme may be used. In such schemes, a private key is stored at a trusted external memory and a corresponding public key is stored in a computer system that is to receive the code from the trusted external memory. A digital signature is computed for the code using the private key and then the code and the digital signature are sent together to the computer system. Digital signature schemes have the property that signatures can only be computed with the knowledge of the private key. To verify the authenticity of the code, the computer system uses the corresponding public key. The code is only allowed to be executed in the computer system if the authenticity of the code received from an external memory is verified, indicating that the external memory is a trusted source.

In step S302 the CPU 104 on the chip 102 calculates a hash of the Application code, including the parity bits, stored in the code RAM 112, using the same hashing algorithm as used to generate the hash in the code signature 203. In other words, the code and the parity bits are used to calculate the hash. In preferred embodiments, this hash is a Secure Hash Algorithm (S HA) hash of the Application code plus parity bits.

In step S304 the code signature 203 is received at the chip 102 from the insecure memory 116. The code signature 203 comprises an encrypted hash value.

In step S306 the code signature 203 received from the insecure memory 116 is decrypted using the public key 106 stored on the chip 102 to produce a hash value. In step S308 the hash generated in step S302 and the hash decrypted in step 306 are compared at the CPU 104 on the chip 102 to verify the authentication of the Application code stored in the code RAM 112 as coming from a trusted source. If the two hashes match then the private key used to encrypt the code signature 203 stored in the insecure memory 116 can be assumed to correspond with the public key 106 stored on the chip 102. This gives basis for chip 102 to trust the code received from the insecure memory 116.

In preferred embodiments, when the chip 102 is initialized, data is initially 5 allowed to be read from and written to the code RAM 112, but the CPU 104 is not allowed to execute the code stored in the code RAM 112. So while the Application code is loaded from the insecure memory 116 into the code RAM 112, no code can be executed from the code RAM 112. However, once the code RAM 112 has finished loading and been authenticated as described above then access to the RAM 112 is switched such that the CPU 104 may execute the code stored in the code RAM 112, but data is no longer allowed to be written to the code RAM 112. Therefore, once the code RAM 112 has been loaded with the Application code and authenticated, it acts as a read only memory. This provides extra security to the system and trust in the Application code stored in the code RAM 112 because it ensures that the data in the code RAM 112 cannot be altered once the Application code has been loaded into the code RAM 112 and authenticated as being from a trusted source.

In some embodiments, the switching of access to the code RAM 112 from read/write data-only access (during loading of the Application code) to read-only instruction-only access (after completion of the loading of the Application code and the authentication of the Application code) is implemented using a register bit in a register 115 on the chip 102. When the register 115 holding the register bit stores a first value, the chip operates in a first access mode in which data can be read from or written to the code RAM 112 but instructions cannot be executed from it. The register 115 holding the register bit may be implemented as a memory-mapped register, a special register within the CPU 104, a register mapped to a peripheral bus on the chip 102, or any other register to which the CPU 104 can write.

Figure 4:
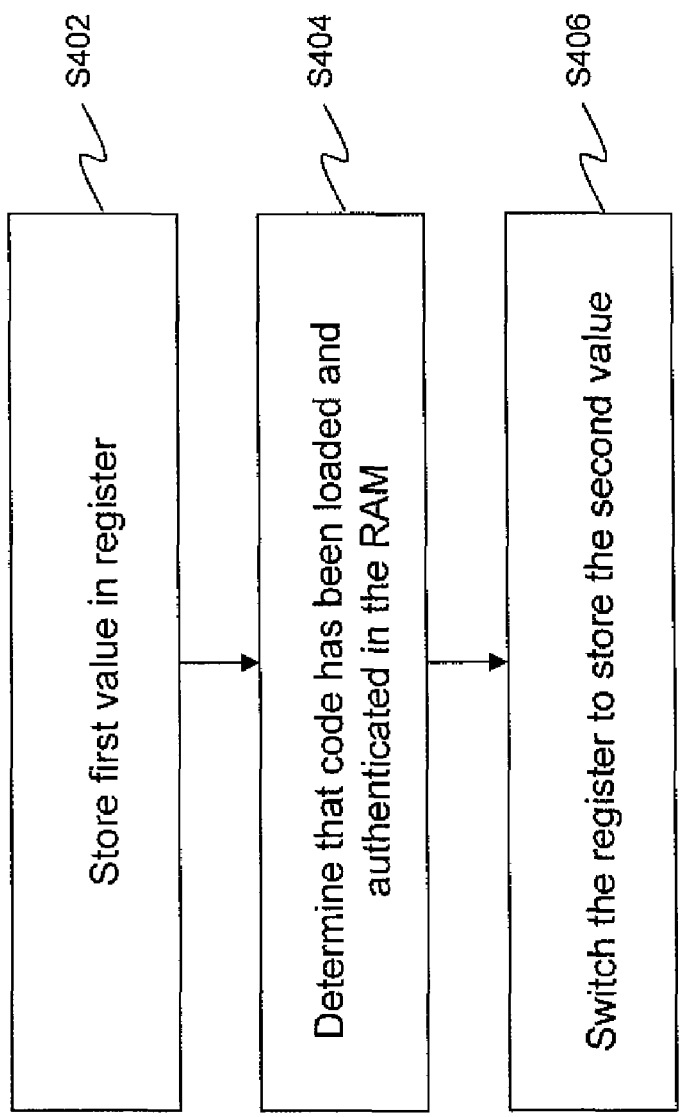
FIG. 4 is a flow chart of a process for using a register to control a RAM according to a preferred embodiment.

FIG. 4 shows a flow chart of a process for implementing the switching of the access to a RAM according preferred embodiments. In step S402, when the chip 102 is initialized, an initialization process is performed. The initialization process may be triggered by a system reset or by resetting the chip, which may be caused for example by powering down and then powering up the system or by pressing a reset pin. In this way, the value in the register 115 is set to the first value in the case of a global reset. Alternatively, the initialization process may 5 be triggered as a result of instructions executed on the CPU 104. As part of the initialization process the value held in the register 115 is set to a first value indicating the first access mode. In the first access mode, code can be written to the code RAM 112 and code cannot be fetched from the code RAM 112 for execution on the CPU 104. As another part of the initialization process, Boot code stored in the Boot ROM 108 may be executed on the CPU 104. The Boot code may instruct the CPU 104 to fetch code from the insecure memory 116 and to load the code into the code RAM 112. When the code has finished loading into the code RAM 112, the CPU 102 verifies the integrity of the code, for example by performing an authorization check such as a signature check on the code as described above. In step S404, it is determined that the Application code has finished loading into the RAM 112 from the insecure memory 116 and that the authentication of the code in the RAM 112 has been verified. When the CPU 104 has verified the integrity of the code in the code RAM 112 it is confirmed that the code in the code RAM 112 can be trusted. In step S406, the CPU 104 writes a second value to the register bit, indicating that the computer system should operate in a second access mode. The second access mode is set in place of the first access mode. In other words, only one of the first and second modes is set at any one time. Setting the second access mode means that the first access mode is no longer set. In other words the first and second access modes are mutually exclusive. In the second access mode, code cannot be written to the code RAM 112 and code can be fetched from the code RAM 112 for execution on the CPU 104. In this way, the CPU 104 can write the second value to the register 115 to "switch" the code RAM 112 from the first access mode to the second access mode. If the CPU 104 does not verify the code then the system remains in the first access mode, such that the code RAM 112 remains writable.

In preferred embodiments, the value of the register 115 can be set from the first value to the second value by the CPU 104, but after initialization of the chip 102, the CPU 104 cannot set the register 115 back to the first value. In these preferred embodiments, the setting of the register 115 by the CPU 104 is a one-way process. In these preferred embodiments, the value stored in the register 115 is "sticky" in the sense that once it has been set to the second value, the CPU 104 cannot set the value back to the first value. This is achieved in that the register is set from the first value to the second value by writing to the register, but the hardware is such that it is not physically possible to set the value of the register to the first value using the same access method. The value in the register 115 is set to the first value during initialization of the chip 102 as described above. In these preferred embodiments the first access mode can be set by an initialization process only, since the CPU 104 cannot subsequently set the value of the register 115 to the first value.

In other, less preferred embodiments, the CPU 104 can set the value of the register 115 from the first value to the second value and can also set the value of the register 115 from the second value back to the first value after initialization of the chip 102. In these less preferred embodiments, the setting of the register 115 by the CPU 104 is a two-way process.

In preferred embodiments, the value of the register bit is used by logic 119 surrounding the code RAM 112 which polices the accesses to the code RAM 112 and decides whether or not to allow each access.

A read request may be received at the logic 119 surrounding the code RAM 112 from the CPU 104 and the logic 119 knows whether the read request from the CPU 104 is as a data read (i.e. the CPU 104 wants to read the contents of the code RAM 112 as data), or as an instruction fetch (i.e. the CPU 104 wants to execute the value returned by the code RAM 112). If the CPU 104 attempts to execute code from the code RAM 112 whilst the register bit is set to the first value (i.e. the system is in the first access mode) then the logic 119 surrounding the code RAM 112 can take action to preserve the security of the system 100—for example, in preferred embodiments, the logic 119 does not respond to the CPU's request for the instruction, and the CPU 104 hangs. In this way, before code has finished loading into the code RAM 112 and been verified by the CPU, by setting the register bit to the first value, the logic 119 surrounding the code RAM 112 is able to police access to the code RAM 112 such that code can be written to the code RAM 112, but code cannot be fetched from the code RAM 112 for execution by the CPU 104.

When the register bit is set to the second value (i.e. the system is in the second access mode) then the logic 119 surrounding the code RAM 112 allows the CPU 104 to fetch code for execution. However, if the logic 119 receives a request to write data to the code RAM 112 when the register bit is set to the second value then the logic 119 can take action to preserve the security of the system 100—for example, discarding the write attempt, or causing the CPU 104 to hang.

Figure 4A:
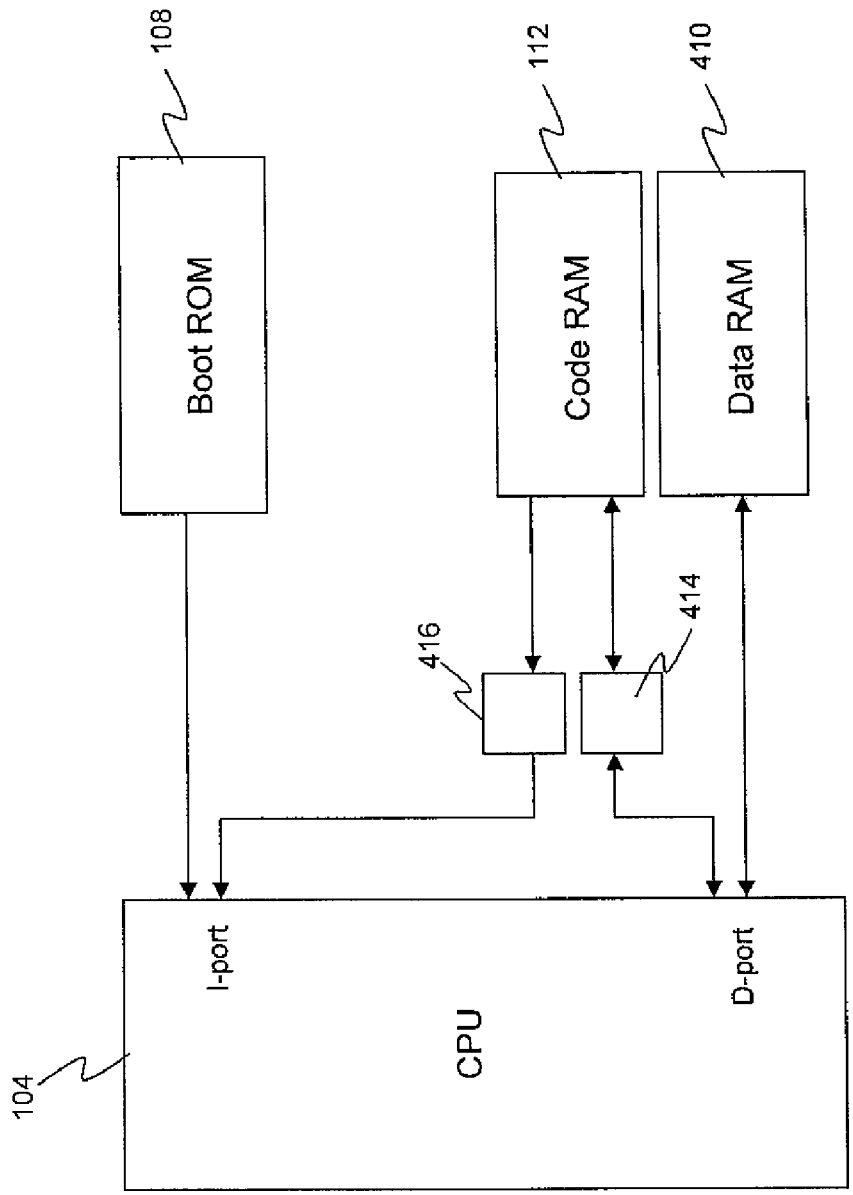
FIG. 4a is a schematic diagram representing part of a system for controlling access to a RAM.

With reference to FIG. 4a there is now described an embodiment of a system for controlling access to the code RAM 112. The CPU 104 has an instruction port ("I-port") and a data port ("D-port"). Instructions, such as Boot code, can be received at the I-port of CPU 104 from the Boot ROM 108. Working data can be stored to and retrieved from the Data RAM 410. The CPU 104 can use the D-port to read and write data to the Data RAM 410. The CPU 104 can use the D-port to read and write code to the code RAM 112 via a first switch 414. The CPU 104 can use the I-port to read code from the code RAM 112 via a second switch 416.

When the system of the embodiment shown in FIG. 4a is initialized, the initialization process includes setting the system to operate in a first access mode as described above, such that the first switch 414 allows code to be written into the code RAM 112 from the D-port of the CPU 104, but the second switch 416 does not allow code to be read from the code RAM 112 at the I-port of the CPU 104. In the first access mode, the CPU 104 sees the code RAM 112 as a ReadNrite data RAM, such that the D-port of the CPU 104 can access the code RAM 112, but the I-port of the CPU 104 cannot access the code RAM 112. The Boot code received from the Boot ROM 108 instructs the CPU 104 to load code from an insecure memory (not shown in FIG. 4a) and to write the code into the code RAM 112 via the first switch 414. Once the code has been loaded into the code RAM 112, then the CPU performs an authentication check on the code as described above by reading the code from the code RAM 112 using the D-port of the CPU 104. If the authentication of the code in the code RAM 112 is verified then the CPU 104 sets the access mode to a second access mode as described above in which the first switch 414 does not allow any further code to be written to the code RAM 112 and the second switch 416 allows code to be received at the I-port of the CPU 104 from the code RAM 112. This means that in the second access mode an execution path from the code RAM 112 to the I-port of the CPU 104 is enabled. The first and second switches (414, 416) use the value of a register 115 (not shown in FIG. 4a) to determine whether to allow data to flow or to prevent data from flowing through the switch. The value of the register 115 can be set as described above to indicate either the first access mode or the second access mode.

In summary, in the embodiment shown in FIG. 4a, in the first access mode the I-port of the CPU 104 has no access to the code RAM 112 and the D-port of the CPU 104 can read from and write to the code RAM 112. In the second access mode the I-port of the CPU 104 can read from the code RAM 112 but cannot write to the code RAM 112 and the D-port of the CPU 104 has no access to the code RAM 112.

In the embodiment shown in FIG. 4a, the CPU 104 is implemented with a Harvard architecture, i.e. the CPU 104 has separate Instruction and Data ports. In other embodiments, other CPU architectures may be used, such as a Von Neumann architecture in which the CPU has a combined Instruction and Data port. In these other embodiments, the logic controlling accesses to the code RAM 112 can determine whether an access request from the CPU is an instruction fetch or a data access, and on that basis can determine whether to allow the access request based on whether the system is operating in the first access mode or the second access mode, as described above.

With reference to FIG. 4b, in some embodiments, the code RAM 112 can be split into a plurality of memory sections $112_1$ to $112_3$, each individually controlled by a respective register bit $115_1$ to $115_3$. Each memory section ($112_1$ to $112_3$) is written, authenticated and then enabled independently. When the first register bit ($115_1$) corresponding to first memory section ($112_1$) is set to a first value, the logic 119 determines that code can be written to the first memory section ($112_1$) but code cannot be executed from the first memory section ($112_1$) as described above. When the first register bit ($115_1$) is set to the second value, the logic 119 determines that code cannot be written to the first memory section ($112_1$) but code can be executed from the first memory section ($112_1$) as described above. Similarly, the second and third register bits ($115_2$ and $115_3$) can be used to respectively control access to the second and third memory sections ($112_2$ and $112_3$) as would be apparent to the skilled person. The logic 119 can use each register bit for a particular memory section independently of the other register bits and memory sections. The logic 119 surrounding the code RAM 112 is aware which section is being accessed based on the address in the code RAM 112.

In some embodiments, the code RAM 112 may also contain memory sections that are not switchable—i.e. they can only be used for storing data, not for executing instructions.

In some embodiments the code RAM 112 may also contain memory sections that are not controlled at all—i.e. they can be written to, read from and executed from without restriction.

In some embodiments the code RAM 112 is not a single block of memory. The code RAM 112 may be made up of a plurality of memory blocks to make one large memory.

Figure 5:
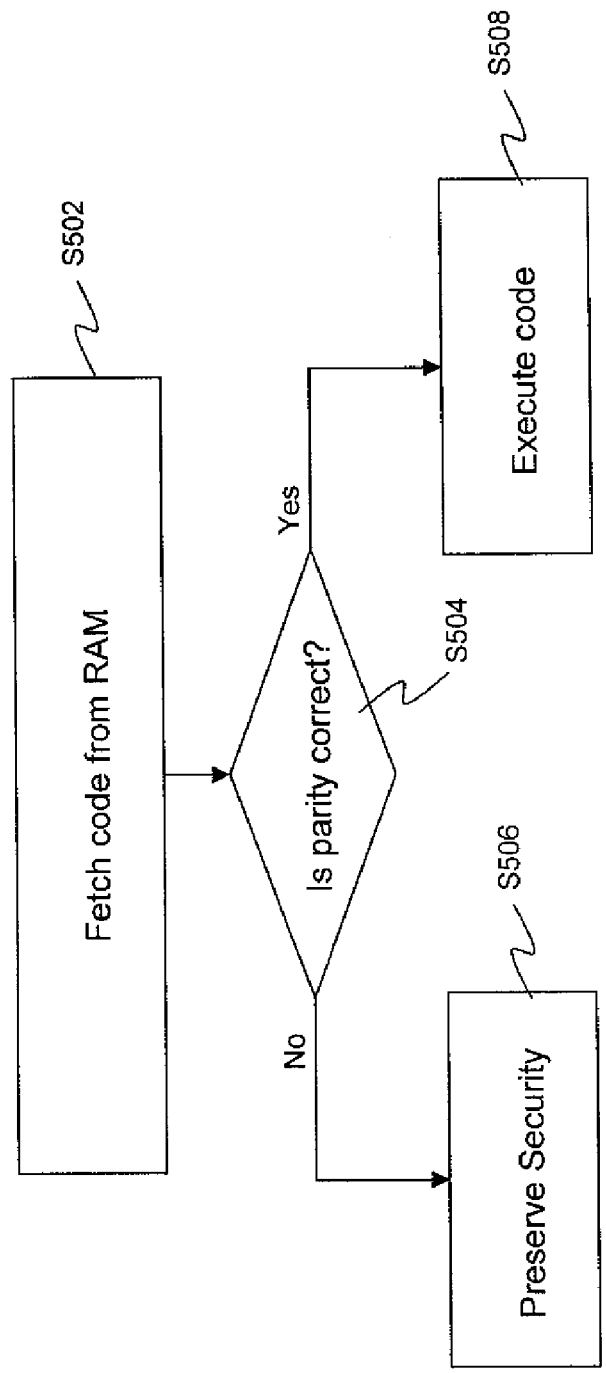
FIG. 5 is a flow chart of a process for fetching code from a RAM according to a preferred embodiment.

With reference to FIG. 5 there is now described a method of fetching Application code from the code RAM 112 according to a preferred embodiment. The Application code is only fetched from the code RAM 112 if the authentication of the code has been verified as described above.

In step S502 the Boot code instructs the CPU 102 to fetch the Application code from the code RAM 112. The fetched Application code and the associated error detection bits are first received at the parity checking block 113 of the parity block 110. The fetched code is fetched in code words.

In step S504 the parity checking block 113 checks the fetched code words of the Application code to determine whether the parity bits of the code words are correct.

If it is detected that the parity of a fetched code word is not correct, then this indicates to the system 100 that the Application code has been altered since the parity bits were generated. Such altered Application code should not be trusted and should not be allowed to be executed on the CPU 102. If it is determined in step S504 that the parity of a fetched code word is not correct then in step S506 the parity checking block 113 takes action to preserve the security of the system 100. For example, the parity block 110 may force a reboot of the chip 102 or cause the CPU 104 to stall.

However, if it is determined in step S504 that the parity bits of the fetched code words are correct then in step S508 the parity checking block 113 allows the instructions of the Application code to be executed by the CPU 104.

As described above, the present invention has advantages over a system in which the Application code is stored in ROM on the chip because it allows the Application code to be developed and improved after manufacture of the device. This allows bug fixes and feature improvements to be provided securely, even in an end-user's home.

Various factors could affect the code loading process which may modify the code as it is written into the code RAM 112. For example, a glitch may occur in which the timing of an operation is too fast for the operation to be correctly performed, or a brown-out may occur in which a power supply is temporarily reduced causing some operations, such as write operations, to malfunction. Write operations are particularly susceptible to factors such as glitches and brown-outs because write operations require a certain level of power and a certain amount of time to be performed correctly. The occurrence of such factors may result in a situation in which code is altered as it is loaded into the RAM. Such altered code may cause the computer system to malfunction.

Embodiments of the present invention advantageously use error detection bits, such as parity bits which are stored with the Application code in the code RAM 112. As described above the use of such parity bits ensures that the Application code has not been modified since the generation of the parity bits. This helps to ensure that the Application code written into the code RAM 112 is the same as that read out from the insecure memory 116. This provides protection against glitches and brown-outs and other factors which may alter the Application code as it is written into the code RAM 112 as described above. In this way, it is ensured that the contents of the code RAM 112 are correct after they have been written.

Some factors, such as glitches and brown-outs as described above, may alter code as it is fetched from the insecure memory 116 to the parity block 110 on link 117 and bus 114. If the code is altered on link 117 or bus 114 then the integrity of the code would not be verified in the authentication check described above. In this way it would be determined that the code should not be trusted.

Furthermore, the parity bits are generated by the parity block 110 on the chip 102 as the Application code is received from the insecure memory 116. This is preferable to storing the parity bits in the insecure memory with the Application code because the parity bits are not required to be stored in the insecure memory 116, thereby saving memory space in the insecure memory 116. It is desirable to save memory space in the insecure memory 116 since this allows more Application code to be stored there, and/or allows the insecure memory 116 to be smaller, cheaper and faster.

The Boot ROM 108 provides a source of trust for the system 100 since the code in the Boot ROM 108 is very difficult to modify after it has been programmed at design or manufacture. The Boot ROM 108 instructs the CPU to load the Application code from the insecure memory 116, and the authentication check and parity check described above allow the system to ensure that the Application code loaded from the insecure memory 116 is trusted code. In this way, the security of the system is ensured, whilst it is possible to update the Application code by updating the Application code in the insecure memory 116.

One application of the chip 102 is as a set top box (STB) chip for use in decoding content streams transmitted by broadcasters. The present invention provides a suitable mechanism for verifying that code received at a STB chip has come from a trusted source.

In some embodiments, the code stored in the insecure memory 116 may be stored in encrypted form. In these embodiments, the code is decrypted on the chip 102 before it is written into the code RAM 112. In other embodiments, the code stored in the insecure memory 116 is not encrypted so no decryption of the code is necessary on the chip 102 before the code is stored in the code RAM 112.

Figure 6:
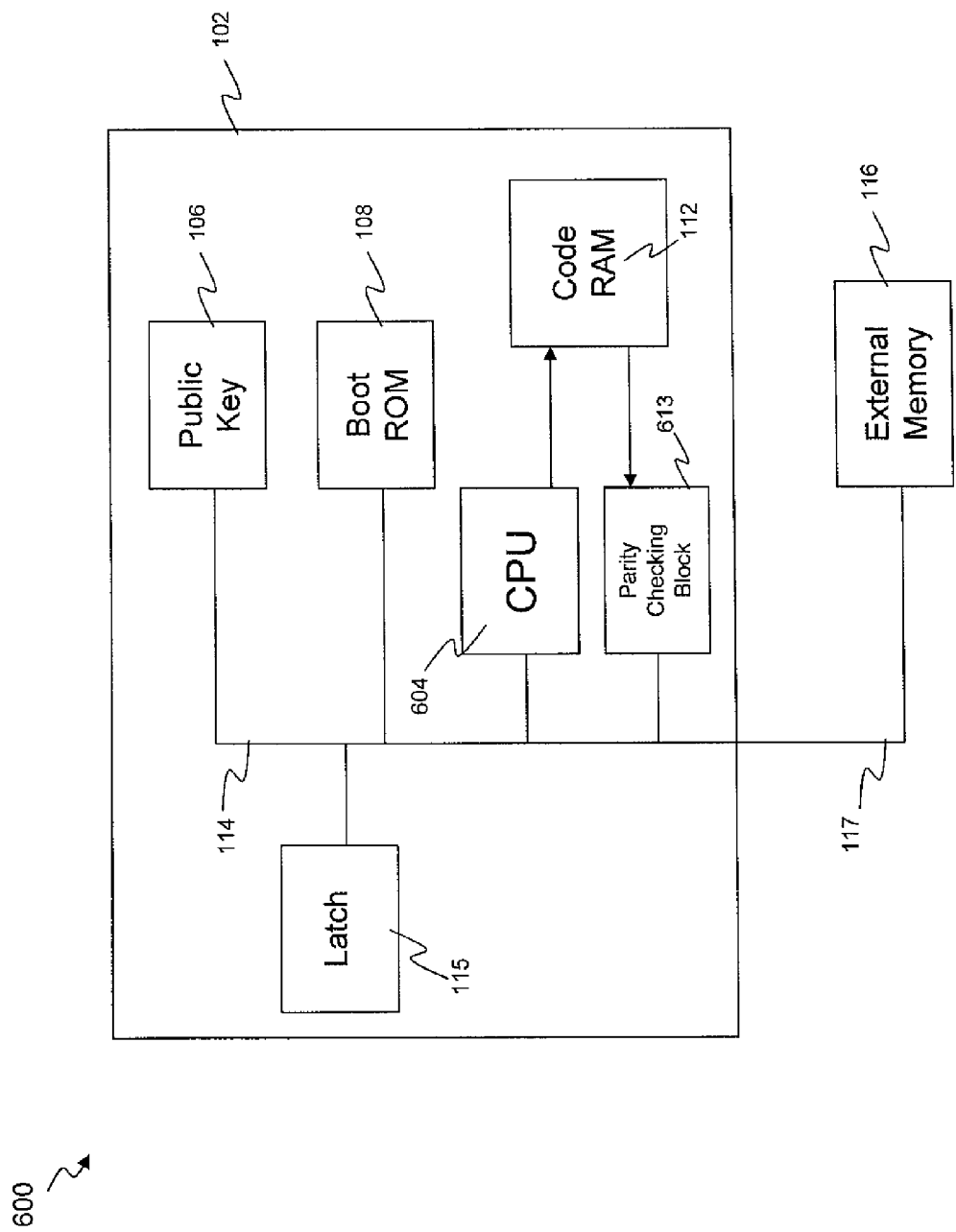
FIG. 6 is a schematic diagram representing a system according to a second embodiment of the present invention.

With reference to FIG. 6 there is now described a system 600 according to a second embodiment of the present invention. Where components are the same as those described above in relation to FIG. 1, like reference numerals have been used in FIG. 6. In the system 600 the parity block does not comprise a parity generation block. Instead, software running on the CPU 604 calculates parity bits. The parity checking block 613 is still implemented in hardware and checks the parity of code and parity bits stored in the code RAM 112 in the same way as described above in relation to parity checking block 113.

In operation, in the system 600, Application code is received via the link 117 at the CPU 604. Software running on the CPU 604 generates error detection bits for each word of the received Application code. The Application code and the generated error detection bits are then stored in the code RAM 112, each fetched word of Application code being stored with associated error detection bits. The rest of the operation of the system 600 is the same as that described above in relation to system 100 of FIG. 1.

It will be appreciated that the above embodiments are described only by way of example. Other applications and configurations may be apparent to the person skilled in the art given the disclosure herein. The scope of the invention is not limited by the described embodiments, but only by the following claims.

What is claimed is:

1. A method of controlling access to a programmable memory in a computer system, the method comprising:
   allowing code to be written to the programmable memory in a first access mode;
   preventing execution of the code stored in the programmable memory in the first access mode;
   verifying the integrity of the code stored in the programmable memory;
   if the integrity of the code stored in the programmable memory is verified, setting a second access mode,
   wherein in the second access mode, further code is prevented from being written to the programmable memory, and execution of the code stored in the programmable memory is allowed, wherein the computer system is initialized using an initialization process which comprises setting the first access mode by setting a mode bit in a register, and wherein the first access mode can be set by the initialization process only.

2. The method of claim 1, wherein a processor is used to verify the integrity of the code stored in the programmable memory and to set the second access mode.

3. The method of claim 2, wherein the value of the register is used to indicate that either the first access mode or the second access mode is set.

4. The method of claim 3, wherein the processor has access to the register.

5. The method of claim 4, wherein the register is one of a memory-mapped register, a special register within the processor or a register mapped to a peripheral bus.

6. The method of claim 5, wherein the programmable memory comprises a plurality of memory sections, and the computer system comprises a respective plurality of registers for controlling access to the plurality of memory sections independently.

7. The method of claim 6, wherein logic surrounding the programmable memory controls access to the programmable memory to preserve the security of the computer system.

8. The method of claim 7, wherein the logic determines that either the first access mode or the second access mode is set, to thereby determine whether to either allow or prevent code being written to the programmable memory and to either prevent or allow execution of the code stored in the programmable memory.

9. The method of claim 8, further comprising:
receiving an access request at the logic to either write code to one of the plurality of memory sections or to fetch code from one of the plurality of memory sections for execution;
determining, by the logic, the one of the plurality of registers associated with the one of the plurality of memory sections using the address of the one of the plurality of memory sections; and
either allowing or preventing the access request based on the value of the one of the plurality registers.

10. The method of claim 9, wherein code cannot be executed from at least one of the plurality of memory sections or wherein access to at least one of the plurality of memory sections is not controlled such that code can be written to and executed from that memory section without restriction.

11. The method of claim 1, wherein the integrity of the code stored in the programmable memory is verified after the code has finished being written to the programmable memory.

12. The method of claim 1, wherein verifying the integrity of the code stored in the programmable memory comprises performing a signature check on the code.

13. A computer system comprising:
programmable memory means for storing code;
means comprising a register for storing a value for setting a first access mode or a second access mode;
logic means for allowing code to be written to the programmable memory means and preventing execution of the code stored in the programmable memory means in the first access mode;
means for verifying the integrity of the code stored in the programmable memory means; and
means for setting the second access mode if the integrity of the code stored in the programmable memory means is verified,
wherein the logic means is configured to prevent further code from being written to the programmable memory means and to allow execution of the code stored in the programmable memory means in the second access mode, wherein the computer system is initialized using an initialization process which comprises setting the first access mode by setting a mode bit in the register, and wherein the first access mode can be set by the initialization process only.

14. The computer system of claim 13, wherein the means for verifying the integrity of the code stored in the programmable memory means and the means for setting the second access mode comprise a processor in the computer system.

15. The computer system of claim 14, further comprising Read-Only Memory means for storing boot code wherein the computer system is configured to be initialized using an initialization process which comprises executing the boot code and fetching the code to be written to the programmable memory means.

16. The computer system of claim 15, wherein the programmable memory means, the means for storing a value, the logic means, the means for verifying the integrity of the code and the means for setting the second access mode are on a chip.

17. The computer system of claim 16 further comprising an insecure memory from which the code is written to the programmable memory means.

18. The computer system of claim 17, wherein the insecure memory is an off-chip memory.

19. The computer system of claim 18, wherein the programmable memory means comprises a plurality of memory blocks.

20. A method for controlling a programmable memory in a computer system, comprising:
setting, by a processor of the computer system, a first access mode by setting a mode bit in a register, the processor setting the first access mode only during an initialization process of the computer system;
enabling writing of code to the programmable memory when the computer system is in the first access mode;
preventing execution of the code when the computer system is in the first access mode;
verifying by the processor, an integrity of the code when the computer system is in the first access mode;
setting, by the processor, a second access mode in response to verifying the integrity of the code;
enabling execution of the code when the computer system is in the second access mode; and
preventing writing of code to the programmable memory when the computer system is in the second access mode.

21. A method as defined in claim 20, further comprising receiving the code at a parity block, generating corresponding parity bits and storing the code and the corresponding parity bits in the programmable memory in the first access mode.

22. A method as defined in claim 21, further comprising calculating a hash of the code and the corresponding parity bits, receiving a signature associated with the code, decrypting a hash from the signature using a public key and comparing the hash derived from the code and the corresponding parity bits with the hash derived from the signature.

23. A method as defined in claim 21, further comprising fetching code from the programmable memory in the second access mode, checking the parity bits corresponding to the fetched code and executing the fetched code if the parity bits are correct.

24. A method as defined in claim 20, wherein the processor sets the first access mode based on initialization code stored in a boot ROM.

25. A method as defined in claim 20, wherein the programmable memory includes two or more sections and wherein each of the sections is independently operable in the first access mode or the second access mode.

26. A computer system comprising:
a programmable memory configured to store executable code;
a register to store a mode bit;
a logic circuit configured to control access to the programmable memory; and
a processor configured to:

set a first access mode by setting the mode bit in the register only during an initialization process of the computer system;

verify an integrity of the code in the programmable memory in the first access mode; and set a second access mode in response to verifying the integrity of the code, wherein the logic circuit is configured to:

enable writing of code to the programmable memory in the first access mode and prevent execution of the code in the first access mode; and enable execution of the code in the second access mode and prevent writing of code to the programmable memory in the second access mode.

27. A computer system as defined in claim 26, further comprising a parity block configured to receive the code and to generate corresponding parity bits for storage with the code in the programmable memory.

28. A computer system as defined in claim 26, further comprising a boot ROM configured to store code for setting the first access mode during the initialization process.

29. A computer system as defined in claim 26, wherein the register is writable only during the first access mode.

30. A computer system as defined in claim 26, wherein the processor includes an instruction port and a data port, further comprising a first switch that allows the data port of the processor to access the code in the first access mode and a second switch that allows the instruction port of the processor to access the code in the second access mode.

31. A computer system as defined in claim 26, wherein the programmable memory includes at least two sections, each independently operable in the first access mode or the second access mode.

* * * * *

UNITED STATES PATENT AND TRADEMARK OFFICE
CERTIFICATE OF CORRECTION

| | | |
|---|---|---|
| PATENT NO. | : 8,219,772 B2 | |
| APPLICATION NO. | : 12/497227 | |
| DATED | : July 10, 2012 | |
| INVENTOR(S) | : David Smith et al. | |

It is certified that error appears in the above-identified patent and that said Letters Patent is hereby corrected as shown below:

Column 5, line 13, should read:
(SHA) hash of the Application code plus parity bits.

Column 7, line 44, should read:
CPU 104 sees the code RAM 112 as a Read/Write data RAM, Signed and Sealed this
Twenty-eighth Day of August, 2012

David J. Kappos
*Director of the United States Patent and Trademark Office*